(12) United States Patent
Landau et al.

(10) Patent No.: US 8,932,981 B2
(45) Date of Patent: Jan. 13, 2015

(54) MANGANESE OXIDE-CERIUM OXIDE COMPOSITE

(75) Inventors: Miron Landau, Beer-sheva (IL);
Mordehai Herskowitz, Meitar (IL);
Meyrav Abecassis-Wolfovich, Beer-sheva (IL)

(73) Assignee: Ben-Gurion University of the Negev Research and Development Authority, Beer-Sheva (IL)

( * ) Notice: Subject to any disclaimer, the term of this patent is extended or adjusted under 35 U.S.C. 154(b) by 915 days.

(21) Appl. No.: 12/086,333

(22) PCT Filed: Dec. 7, 2006

(86) PCT No.: PCT/IL2006/001407
§ 371 (c)(1),
(2), (4) Date: Jan. 23, 2009

(87) PCT Pub. No.: WO2007/069238
PCT Pub. Date: Jun. 21, 2007

(65) Prior Publication Data
US 2009/0206042 A1 Aug. 20, 2009

(30) Foreign Application Priority Data
Dec. 13, 2005 (IL) .......................................... 172552

(51) Int. Cl.
*B01J 23/10* (2006.01)
*B01J 23/34* (2006.01)
(Continued)

(52) U.S. Cl.
CPC ........... *C01F 17/0043* (2013.01); *B01J 23/002* (2013.01); *B01J 23/34* (2013.01); *B01J 29/0341* (2013.01); *B01J 35/002* (2013.01); *B01J 37/0018* (2013.01); *B82Y 30/00* (2013.01); *C02F 1/725* (2013.01); *B01J 2229/18* (2013.01); *B01J 2229/22* (2013.01); *B01J 2229/38* (2013.01); *B01J 2523/00* (2013.01); *C01P 2002/50* (2013.01); *C01P 2002/60* (2013.01); *C01P 2002/72* (2013.01); *C01P 2004/64* (2013.01); *C01P 2004/82* (2013.01); *C01P 2006/10* (2013.01); *C01P 2006/12* (2013.01); *C01P 2006/14* (2013.01); *C01P 2006/16* (2013.01); *C02F 2101/34* (2013.01); *C02F 2101/36* (2013.01); *C02F 2101/38* (2013.01)
USPC ........................................... 502/304; 210/763

(58) Field of Classification Search
USPC .......................................... 502/304; 210/763
IPC ...... B01J 23/10,23/34; C01F 17/00; C02F 1/72
See application file for complete search history.

(56) References Cited

U.S. PATENT DOCUMENTS 2,435,379 A * 2/1948 Archibald ........................ 502/8
2003/0166987 A1 9/2003 Roark
(Continued)

FOREIGN PATENT DOCUMENTS

WO 94/04251 3/1994
WO WO 01/45833 6/2001

OTHER PUBLICATIONS
Laha et al (Chem. Commun. 2003, 2138-2139).*
(Continued)

*Primary Examiner* — Jun Li
(74) *Attorney, Agent, or Firm* — Nixon & Vanderhye P.C.

(57) ABSTRACT

A process which comprises providing a porous matrix, mixing said porous matrix with a precursor solution containing manganese and cerium ions dissolved therein, triggering the formation of a non-fluid phase which contains manganese and cerium in the interior of said porous matrix, separating said porous matrix from a liquid phase containing soluble metals, completing the formation of said non-fluid phase which contains manganese and cerium in the interior of said porous matrix, heat treating said porous matrix to convert said non-fluid phase containing manganese and cerium placed therein into a manganese oxide-cerium oxide composite, and isolating said composite from said porous matrix. The resulting composite, and its use as a catalyst, are also provided.

9 Claims, 4 Drawing Sheets

(51) Int. Cl.
*C01F 17/00* (2006.01)
*B01J 23/00* (2006.01)
*B01J 29/03* (2006.01)
*B01J 35/00* (2006.01)
*B01J 37/00* (2006.01)
*B82Y 30/00* (2011.01)
*C02F 1/72* (2006.01)
*C02F 101/34* (2006.01)
*C02F 101/36* (2006.01)
*C02F 101/38* (2006.01)

(56) References Cited

U.S. PATENT DOCUMENTS

| 2004/0044248 | A1* | 3/2004 | Gaffney et al. | 562/547 |
| 2004/0192947 | A1 | 9/2004 | Chane-Ching et al. | |
| 2005/0164870 | A1* | 7/2005 | Shan et al. | 502/64 |
| 2006/0042417 | A1* | 3/2006 | Gash et al. | 75/415 |

OTHER PUBLICATIONS

Chen et al., "Composition-activity effects of Mn-Ce-O composites on phenol catalytic wet oxidation", Applied Catalysis B: Environmental, vol. 32, 2001, pp. 195-204.

Tang et al., "$MnO_x$-$CeO_2$ mixed oxide catalysts for complete oxidation of formaldehyde: Effect of preparation method and calcination temperature", Applied Catalysis B: Environmental, vol. 62, 2006, pp. 265-273.

Fuertes, "A general and low-cost synthetic route to high-surface area metal oxides through a silica xerogel template", Journal of Physics and Chemistry of Solids, vol. 66, 2005, pp. 741-747.

Imamura et al., "Wet Oxidation of Ammonia Catalyzed by Cerium-Based Composite Oxides", Ind. Eng. Chem. Prod. Res. Dev., vol. 24, 1985, pp. 75-80.

Larachi, "Catalytic wet oxidation: micro-meso-macro methodology from catalyst synthesis to reactor design", Topcis in Catalysis, vol. 33, Apr. 2005, pp. 109-134.

Zhao et al., "Morphological Control of Highly Ordered Mesoporous Silica SBA-15", Chem. Mater. vol. 12, 2000, pp. 275-279.

International Search Report for International Application No. PCT/IL2006/001407, mailed Mar. 21, 2007.

Written Opinion of the International Searching Authority for PCT/IL2006/001407, mailed Mar. 21, 2007.

Haiyan, Chen et al., "Composition-Activity Effects of Mn-Ce-O Composites on Phenol Catalytic Wet Oxidation", Applied Catalysis B: Environmental, Elsevier, vol. 32, No. 3, pp, 195-204, (Aug. 1, 2001).

Tang et al., "MnOx-CeO2 Mixed Oxide Catalysts for Complete Oxidation of Formaldehyde: Effect of Preparation Method and Calcination Temperature", Applied Catalysis B: Environmental, Elsevier, vol. 62, No. 3-4, pp. 265-273, Sep. 28, 2005 (published Feb. 22, 2006).

Fuertes A.B., "A General and Low-Cost Synthetic Route to High-Surface Area Metal Oxides Through a Silica Xerogel Template", Journal of Physics and Chemistry of Solids, vol. 66, No. 5, pp. 741-747, (May 2005).

* cited by examiner

MANGANESE OXIDE-CERIUM OXIDE COMPOSITE

This application is the U.S. national phase of International Application No. PCT/IL2006/001407, filed 7 Dec. 2006, which designated the U.S. and claims priority to Israel Application No. 172552, filed 13 Dec. 2005, the entire contents of each of which are hereby incorporated by reference.

Manganese oxide-cerium oxide composite has been proposed in the art for use in the catalysis of oxidation reactions of organic matter present in contaminated water or combustion gas effluents. The term "manganese oxide-cerium oxide composite" refers to a composition of matter which may be generally described as a mixed oxide of said two metals, comprising at least one phase of manganese oxide and at least one phase of cerium oxide. Manganese oxide-cerium oxide composite suitable for use as catalyst is generally characterized by a high degree of crystallinity.

In its most general form, the synthetic route for preparing manganese oxide-cerium oxide composite involves the co-precipitation of said metals from an alkaline solution, in the form of their corresponding hydroxides, followed by thermal treatment of the isolated material to give the composite in a crystalline form.

For example, Imamura et al. [Ind. Eng. Chem. Prod. Res. Dev. 24, p. 75-80 (1985)] describe the preparation of manganese oxide-cerium oxide composite by the co-precipitation of manganese and cerium, in the form of their hydroxides and/or oxides, from a solution using sodium hydroxide. The precipitate was isolated and subsequently calcined at 350° to afford the catalyst.

WO 01/45833 describes various cerium based catalyst compositions.

US 2003/0166987 describes the synthesis of manganese oxide-cerium oxide catalysts suitable for the destruction of organic compounds in liquid media. The catalysts were synthesized by co-precipitating manganese and cerium from a solution (in the form of their hydroxides), in the presence of an alkaline agent, such as $NH_4OH$. The isolated composite was subsequently heat treated between 100 and 500° C. The catalyst obtained was identified as a crystalline material characterized by particle size in the range of 30 and 7000 nm and surface area (BET) lower than 120 $m^2/g$, typically between about 60 and 120 $m^2/g$.

US 2004/0192947 discloses the preparation of a catalyst which is composed of a mineral matrix, and more specifically, a silica matrix, having particles of metal oxides trapped therein.

Larachi [Topics in Catalysis, vol. 33, nos. 1-4, p. 109-134 (2005)] describes the application of manganese oxide-cerium oxide composite in catalytic wet oxidation.

It has now been found that it is possible to prepare manganese oxide-cerium oxide composite by forming either a gel or a precipitate containing said metals in the interior of a suitable porous matrix, and, following heat treatment, isolating from said porous matrix a manganese oxide-cerium oxide composite exhibiting high degree of crystallinity and high surface area.

More specifically, the present invention is directed to a process which comprises providing a porous matrix, mixing said porous matrix with a precursor solution containing manganese and cerium ions dissolved therein, triggering the formation of a non-fluid phase which contains manganese and cerium in the interior of said porous matrix, separating said porous matrix from a liquid phase containing soluble metals, completing the formation of said non-fluid phase which contains manganese and cerium in the interior of said porous matrix, heat treating said porous matrix to convert said non-fluid phase containing manganese and cerium placed therein into a manganese oxide-cerium oxide composite, and isolating said composite from said porous matrix.

The process according to the present invention involves the formation of a non-fluid phase which contains manganese and cerium in the interior of a porous matrix. The non-fluid phase is in the form of either a gel containing manganese and cerium, or a precipitate containing manganese and cerium.

The term "porous matrix", as used herein, refers to a porous material having pores or channels within its structure, capable of receiving and retaining liquid therein. Mesoporous materials, which are characterized by pore size in the range of 2 to 50 nm, are especially preferred for use as the porous matrix according to the present invention. Preferably, the surface area of the mesoporous material intended for use in the process is not less than 200 $m^2/g$, and its pore volume is not less than 0.5 $cm^3/g$.

Among the class of mesoporous materials, mesoporous silicas are particularly preferred for use in the process of the present invention. The preparation of mesoporous materials, and specifically, mesoporous silicas, is known in the art, and is described, inter alia, by Zhao et al. [Chem. Mater., 12, 275 (2000)]. According to the procedure described therein, an especially preferred mesoporous silica, SBA-15, is prepared by crystallization of poly(ethylene glycol)-block-poly(propylene glycol)-block poly(ethylene glycol)-copolymer (having average molecular weight of 5800) and tetramethylorthosilicate, from acidic aqueous solution.

Mesoporous silica-gel may also be used as the porous matrix according to the present invention. The preparation of mesoporous silica-gels is well known in the art and is described, inter alia, by Iller [Chemistry of silica, Willy, N.Y., 1979]. The preparation is based on the acidification of an aqueous solution of metal silicates at pH in the range between 3 and 7.

According to the process of the present invention, a solution containing manganese and cerium ions is used to introduce said metals into the pores of the porous matrix. Hereinafter, the solution containing the soluble manganese and cerium salts is designated, for the sake of brevity, the 'precursor solution'. The precursor solution is prepared by dissolving at least one manganese salt and at least one cerium salt, wherein said salts contain water of crystallization, in a suitable solvent or solvents system. A water-miscible organic solvent, for example, lower ($C_1$-$C_3$) alcohol, especially methanol, or mixtures thereof, may be used for preparing the solution. The concentration of the cerium and manganese in the solution is preferably in the range of 0.1 to 3.0M. More specifically, the concentrations of the cerium and manganese in the precursor solution are in the ranges of 0.15 to 0.4M and 1.5 to 3.0M, respectively. Preferred metal salts to be dissolved in the solution are the hydrated chloride salts, namely, $MnCl_2.4H_2O$ and $CeCl_3.7H_2O$.

The precursor solution and the solid porous matrix are mixed in a suitable vessel, most preferably to form a suspension, thus assuring that the porous matrix is well impregnated with said solution. The weight ratio between the precursor solution and the solid porous matrix is preferably in the range of 5 to 20, and more preferably in the range of 12 to 17. The mixing may be carried out at a temperature in the range of 20° C. to 35° C., and preferably at room temperature, and may last for about 1 to 120 minutes. Preferably, the solution is mixed for not less than 30, and more preferably for not less than 60 minutes.

Hereinafter, the term "suspension" is used to describe the outer appearance of the mixture formed, which consists of a solid porous matrix suspended within a liquid phase, whereas the term "metal-containing solution", when used hereinafter, is used to describe the portion of the original precursor solution which has entered into the internal volume of the porous matrix, essentially filling the pores thereof.

In order to cause the formation of a non-fluid phase which contains manganese and cerium in the interior of the porous matrix, the pH of the metal-containing solution need to be raised to form an environment allowing the formation of a gel containing said metals, or the precipitation of said metals from the solution. To this end, the pH of the metal-containing solution should preferably be adjusted to a value above 6.0, and more preferably to a value in the range of 6.0 to 7.5. However, it is important to avoid the undesirable concomitant precipitation of the metals from the liquid phase of the suspension that is outside the boundaries of the porous matrix. This undesirable precipitation may interfere with the subsequent isolation of the solid matrix from the suspension.

It has been observed that it is possible to form the pH environment allowing the formation of a non-fluid phase containing manganese and cerium in the interior of the porous matrix by introducing into the suspension a pH modifying agent which is capable of raising the pH of said suspension to the desired environment slowly, such that the formation of said non-fluid phase is accomplished following a prolonged period of time. The delayed formation of the non-fluid phase containing manganese and cerium in the suspension provides sufficient time during which an easy and convenient separation between the solid (porous matrix) and liquid phases of the suspension may be accomplished. Thus, according to a preferred embodiment of the present invention, the pH modifying agent is dissolved in the suspension and is delivered into the interior of porous matrix, such that the undesired gelation and/or precipitation of manganese and cerium from the liquid phase of the suspension, outside the boundaries of the porous matrix, is delayed for a sufficient time which is preferably not less than 5, and more preferably not less than 10, and most preferably not less than 15 minutes.

A preferred pH modifying agent is a proton scavenger which is soluble in the suspension, and which is capable of capturing protons (presumably from the water molecules of the hydrated salts) via one or more chemical reactions, without damaging the stability and structure of the porous material. Particularly preferred are proton scavengers which are capable of acting as gel forming agents, such as low molecular weight epoxides, including ethylene oxide and propylene oxide, wherein the latter is especially preferred. The molar ratio of the pH modifying agent relative to the total amount of the manganese and cerium is in the range 5 to 10, and preferably 6 to 8. The use of a pH modifying agent which acts as a gel forming agent results in the formation of a non-fluid phase which contains manganese and cerium in the interior of said porous matrix, wherein said non-liquid phase is in the form of a gel.

In order to prevent the premature formation of a precipitate and/or gel containing the metals in the liquid phase of the suspension, it is preferred to use, in combination with the pH modifying agent described above, also a precipitation/gelation inhibiting agent. The term "precipitation/gelation inhibiting agent" refers to a compound which opposes the creation of a pH environment necessary for the formation of a non-fluid phase that contains manganese and cerium in the suspension, for example, by rendering the pH of the suspension sufficiently acidic, or by slowing the rate of the reaction in which the pH modifying agent participates. It should be noted that the precipitation/gelation inhibiting agent may be added to the precursor solution before it is mixed with the porous matrix to form the suspension. Alternatively, the precipitation/gelation inhibiting agent is introduced into the suspension prior to, or concurrently with, the addition of the pH modifying agent.

According to one preferred embodiment, a suitable precipitation/gelation inhibiting agent is an organic acid of the formula HA (e.g., acetic acid or citric acid). Without wishing to be bound by theory, it is believed that the organic residue $A^-$ functions as a ligand which stabilizes the partially hydrolyzed Mn and Ce ions in the metal-containing solution, whereby the progress of the sol-gel process, to give a gel which contains manganese and cerium, is inhibited. The molar ratio between the HA precipitation/gelation inhibiting agent and the total quantity of manganese and cerium in the precursor solution is in the range of 0.1 to 1, and more preferably 0.4 to 0.6. Other suitable precipitation/gelation inhibiting agent may be polydentate ligands (e.g., ethylenediaminetetra-acetic acid).

As discussed above, according to a preferred embodiment of the invention, the solid porous matrix and the precursor solution are mixed to form a suspension. Having triggered the formation of a non-fluid phase containing manganese and cerium in the interior of said porous matrix, as described in detail above, the suspension is treated in order to separate the porous matrix from the liquid phase containing soluble metals. This separation is most suitably accomplished by filtration, to give the wet solid organic matrix.

It should be noted, however, that the mixing of the porous matrix with a considerable excess of the precursor solution to form a suspension is not mandatory. It is possible to use the precursor solution in an amount which essentially corresponds to the absorbance capacity of the solid matrix (for example, the absorbance capacity of SBA-15 porous matrix is 1.5 ml/g). In this case, the pH modifying agent may be delivered into the pores of the porous matrix by passing a stream of propylene oxide therethrough. This will result in the formation of a non-fluid phase in the form of a gel which contains manganese and cerium in the interior of said porous matrix.

Following the isolation of the wet porous matrix from the suspension, the formation of a non-fluid phase which contains manganese and cerium in the interior of said porous matrix may proceed to completion, most preferably by allowing the wet porous matrix to stand for several hours in a closed vessel under an environment saturated with vapors of the solvent used to form the precursor suspension, at a temperature in the range between 20 and 35° C., preferably at ambient temperature. For example, when the precursor solution is a methanol solution, the isolated wet solid porous matrix is placed in a closed vessel saturated with methanol vapors at about 25° C. for about 6 to 15 hours.

Having completed the formation of a non-fluid phase which contains manganese and cerium in the interior of said porous matrix, said solid porous matrix may be washed with a suitable washing liquid, which is most preferably the solvent used for preparing the precursor solution, and is then separated from said washing liquid, e.g., by filtration. It is preferred to repeat the washing procedure several times, in order to assure that residual dissolved manganese and cerium ions that do not form part of the non-fluid phase present in the pores of the porous matrix, are completely eliminated therefrom. Having completed the washing cycles, the solid porous matrix, having the gel or the precipitate containing the metals placed therein, is dried, for example, by vacuum drying at a temperature in the range of 100 to 120° C., preferably for at least 3 hours.

The dried porous matrix is heat treated under conditions allowing the conversion of the non-fluid phase containing the metals in the interior of the porous matrix (in the form of their hydroxides) into the desired manganese oxide-cerium oxide composite having sufficiently high degree of crystallinity. To this end, the dried porous matrix is subjected to calcination, which is preferably performed at two or more consecutive stages.

The dried porous matrix is calcined at a first temperature for a period of time allowing the dehydration and dehydroxylation of the non-fluid phase containing the metals, thus converting the same into an amorphous oxide. The first calcination stage may be carried out at a temperature in the range of 300 to 400° C., and preferably at a temperature in the range of 330 to 370° C., for not less than one hour, and preferably for two to five hours.

The subsequent calcination stage is intended to transform the metals-containing amorphous oxide placed within the interior of the porous matrix into the desired, highly crystalline manganese oxide-cerium oxide composite. The temperature at which the transformation of the amorphous material into a crystalline form may be accomplished can be determined upon calcining the porous matrix for several hours at several different temperatures in the range of 400 to 750° C., generating for the porous matrix calcined at each of said temperatures the corresponding X-ray diffraction pattern (XRD), and identifying the temperature at which the calcination affords a material exhibiting characteristic diffraction peaks (in the range of 28 to 35 2θ) in a sufficient intensity. For example, FIG. 1 shows the X-ray diffraction patterns produced for a SBA-15 porous matrix containing the manganese oxide-cerium oxide composite following calcination at 350° C., 500° C., 600° C. and 700° C. (designated by the letters 'a', 'b', 'c' and 'd' in FIG. 1, respectively). It may be seen that in the case of SBA-15 porous matrix, the desired, essentially crystalline manganese oxide-cerium oxide composite can be formed following calcination at 700° C. (the diffraction pattern designated by the letter 'e' belongs to the isolated manganese oxide-cerium oxide composite, obtained following the removal of the SBA porous matrix, and is discussed hereinbelow). Thus, the second calcination stage is preferably carried out at a temperature in the range of 650 to 710° C. for not less than one hour, and preferably for two to five hours.

Having completed the calcination affording the highly crystalline manganese oxide-cerium oxide composite, said composite is isolated from the porous matrix using either chemical or physical methods, or a combination thereof. For example, the manganese oxide-cerium oxide composite may be suitably isolated from the porous matrix by treating the latter with a solvent capable of dissolving said porous matrix, wherein said composite is insoluble in said solvent, following which said solid composite is recovered from the resulting suspension. Specifically, in the case of porous matrix made of silica, the isolation of the composite may be accomplished by treating the silica porous matrix containing the composite therein with an alkaline solution at an elevated temperature, to cause the dissolution of the silica. A suitable alkaline solution may be either an aqueous solution or an aqueous alcohol solution having a strong base such as sodium hydroxide dissolved therein. The solid manganese oxide-cerium oxide composite is collected by filtration or centrifugation and is further purified by washing the same with water and an alkaline solution. The purified composite is finally dried.

The resulting, highly crystalline product forms another aspect of the present invention. The manganese oxide-cerium oxide composite provided by the present invention is in the form of agglomerates composed of primary particles which are nano-crystallites, the average diameter of which is preferably less than 5 nm, and more preferably less than 3 nm, and most preferably in the range of 1 to 3 nm, as may be determined by XRD. The manganese oxide-cerium oxide composite is characterized by a surface area of not less than 200 m$^2$/g, more preferably not less than 250 m$^2$/g, and most preferably not less than 300 m$^2$/g; as may be determined by BET (the nitrogen adsorption technique).

Compositionally, according to one preferred embodiment of the invention, the ratio between manganese and cerium ions in the composite is in the range of 1:1 to 3:1, and more preferably in the range of 1.4:1 to 1.9:1. Preferably, the composite comprises an essentially single phase of manganese oxide and an essentially single phase of cerium oxide, which are $Mn_2O_3$ and $CeO_2$, respectively, in a weight ratio of 0.4:1 to 0.8:1, and more preferably 0.5:1 to 0.7:1. The degree of crystallinity of the composite is not less than 70%, and more preferably not less than 90% and most preferably not less than 95% (w/w), as determined by XRD. The silica content of the product is less than 10%, and more preferably less than 7% (w/w).

The manganese oxide-cerium oxide composite described above may be used as a catalyst, especially in wet oxidation reactions. To this end, the manganese oxide-cerium oxide composite described above, which is in the form of a powder, may be shaped into a particulate form that can be easily loaded into a continuous reactor. For example, the powdered manganese oxide-cerium oxide composite may be pressed and/or compacted to give pellets, following which the resulting pellets are crushed and sieved in order to recover a suitable fraction of granules. If desired, the pellets may further comprise various additives for increasing the mechanical strength of the pellets (e.g., graphite powder). Alternatively, a binder-containing catalyst formulation which comprises the manganese oxide-cerium oxide composite may be prepared by methods well known in the art, namely, by means of wet granulation, followed by calcination. Suitable binders include, for example, alumina and silica. The use of the manganese oxide-cerium oxide composite of the present invention in the preparation of solid forms adapted for catalytic applications, such as pellets or granules, and said pellets and granules obtained therefrom, constitute additional aspects of the present invention.

It has been found that the manganese oxide-cerium oxide composite of the present invention allows the complete oxidation of organic contaminates present in water to give carbon dioxide and water. Specifically, the manganese oxide-cerium oxide composite may be used in purifying water contaminated by organic substances such as carboxylic acids, alcohols, ethers, phenols, aldehydes, ketones, aliphatic and aromatic compounds, including heteroaromatic compounds, which may be optionally halogenated.

Accordingly, in another aspect, the present invention provides a process for the purification of water, which comprises the oxidation of organic contaminants present in said water using manganese oxide-cerium oxide composite as a catalyst, wherein at least one of said contaminants is converted substantially completely into carbon dioxide and water.

The term "substantially complete conversion of the organic contaminant into carbon dioxide and water" means that not less than 70%, and preferably not less than 80%, and more preferably not less than 90% by weight of the oxidation products of said organic contaminant are $CO_2$ and water. Specific organic contaminants, which underwent substantially complete conversion into carbon dioxide and water during a wet oxidation process catalyzed by the manganese oxide-cerium oxide according to the present invention include 2,4,6-trichlorophenol, methyl-tert-butyl ether and aniline.

More specifically, the purification process of the present invention involves feeding the contaminated water to be treated into a tubular fixed-bed reactor loaded with the catalyst, using air as the oxidizing agent, and more preferably, air at partial oxygen pressure of not less than 5, and more preferably about 10 bar (1 MPa). The purification process is preferably carried out at a temperature above 60° C. and more preferably in the range between 80 and 140° C. The preferred liquid hourly space velocity (LHSV) value is in the range 1 to 30, and more 5-20 h$^{-1}$.

EXAMPLES

Figure 1:
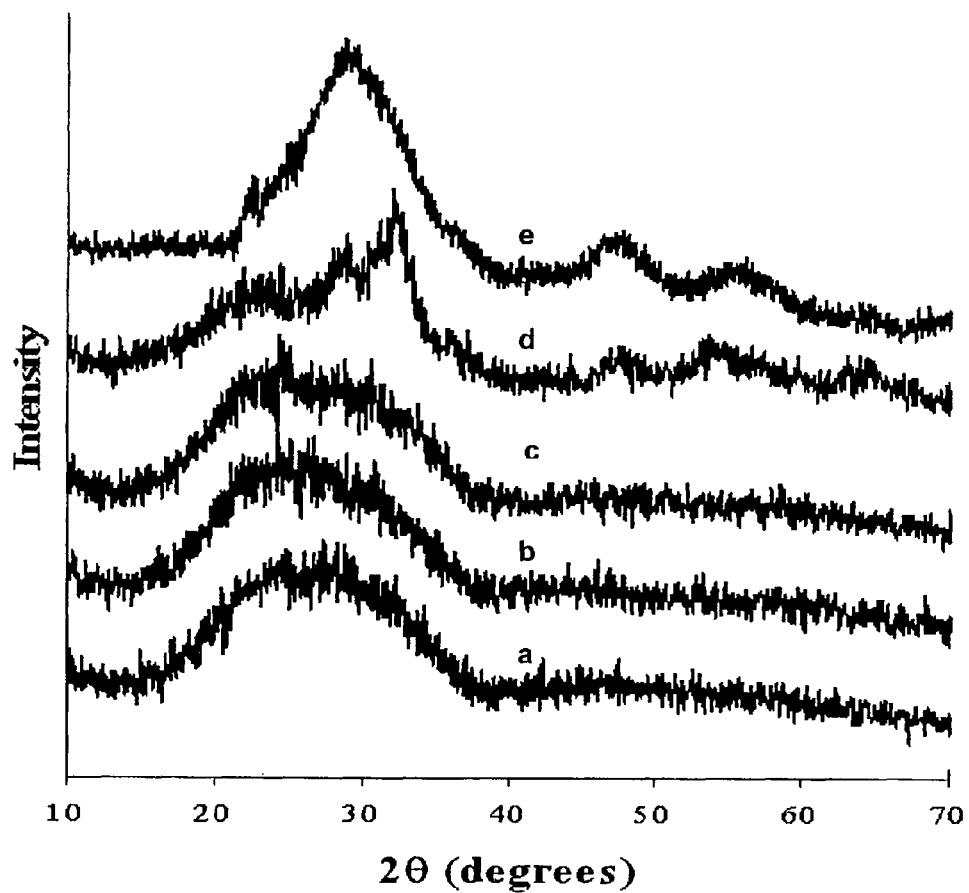
FIG. 1: PXRD spectra generated for the SBA porous material having the composite placed therein following calcinations at different temperatures (a-d) and for the isolated composite (e).

All percentages, unless otherwise indicated, are weight percent.

Methods

X-Ray Diffraction (XRD)

The conventional wide-angle X-ray diffraction (XRD) patterns were obtained on a Guinier G 670 camera (Cu—$K_{\alpha 1}$ radiation) connected to a rotating-anode X-ray source that was operated at 40 kV and 100 mA. The data were collected in the range of $2\theta=3°-70°$ with a step size of 0.005°. The exposition time was 30 min, and the average size of the crystal domains was determined with Scherrer's equation, $h=K\lambda/[(B^2-\beta^2)^{0.5} \cos(2\theta/2)]$, where $K=1.000$ is the shape factor, $\lambda=0.154$ nm, B is the line broadening width and $\beta$ is the instrumental broadening correction. The peak positions and the instrumental peak broadening were determined by fitting each diffraction peak by means of APD computer software.

Surface Area and Pore Volume Measurements

Surface area and pore volume were derived from $N_2$ adsorption-desorption isotherms using conventional BET and BJH methods (Barrett-Joyner-Halenda method, Journal of American Chemical Society, 73, 373, 1951). The samples were degassed under vacuum at 250-270° C., depending on their thermal stability. Isotherms were measured at liquid nitrogen temperature with a NOVA-2000 Quantachrome, Version 7.02 instrument.

Small Angle X-Ray Scattering (SAXS)

SAXS patterns were obtained using Ni-filtered Cu—$K_{\alpha}$ radiation (Seifery ID3000 generator) which was directed through an evacuated compact Kratky camera (Anton PAAR) onto the sample placed on a 1.5 mm diameter glass capillary.

Catalyst Performance Measurements

Total Organic Carbon (TOC)

TOC was determined using TOC combustion analyzer, Apollo 9000 HS model (Tekmar Dohmann) PC controlled, equipped with non-dispersive infrared (NDIR) detector. The samples were diluted with distilled water (1:10 volume) and injected to the TOC analyzer.

Catalyst activity parameters are compared by measuring the conversion of 2,4,6-Trichlorophenol (TCP) to phenol or TOC and TCP concentrations, at the reactor inlet and at the reactor outlet using the definitions:

$X_{Toc}$, $X_{TCP}$:

$$\%X_i=(1-[C_i]_{outlet}/[C_i]_{inlet})*100$$

where: $[C_i]$ is TCP or TOC concentrations;
De-halogenation:

$$\%\text{De-halogenation}=([Cl^-]_{outlet}/[Cl^-]_{calculated})*100$$

where: $[Cl^-]_{outlet}$ is the amount of $Cl^-$ ions measured in the outlet stream and $[Cl^-]_{calculated}$ is the amount of $Cl^-$ ions calculated under the assumption that all the chlorine atoms of TCP are released from the organic material to the aqueous solution. The chloride ion content was determined by a standard argentometric method APHA-4500 (APHA, 1998).

Inductively Coupled Plasma (ICP)

Manganese and cerium ions concentrations in the effluent stream of the catalyst testing experiments were measured using a PQ3/VGICP-MS system.

Preparation 1

Mesoporous Silica SBA-15 for Use as a Porous Matrix 14.0 g of poly(ethylene glycol)-block-poly(propylene glycol)-block-poly(ethylene glycol)triblock copolymer (Aldrich, $H(—OCH_2CH_2)_x[—OCH(CH_3)—CH_2—]_y(—OCH_2CH_2—)_zOH)$, $M_{average}=5800$) were dissolved with stirring in 447 ml of water and 66 ml of 32 wt. % HCl for 1 h at 50° C., followed by addition of 21.7 g of tetramethylorthosilicate with stirring for 10 min. The solution was then transferred into a Teflon reactor and stirred first at 60° C. for 24 h and then at 100° C. for 24 h. After cooling to room temperature, the solid product was recovered by filtration without washing, and was dried in air at room temperature for 16 h and at 100° C. for 2 h. Calcination at 300° C. for 2 h, 400° C. for 2 h, and 500° C. for 6 h (with a slow temperature increase of 1° C./min) completed the preparation.

Figure 2:
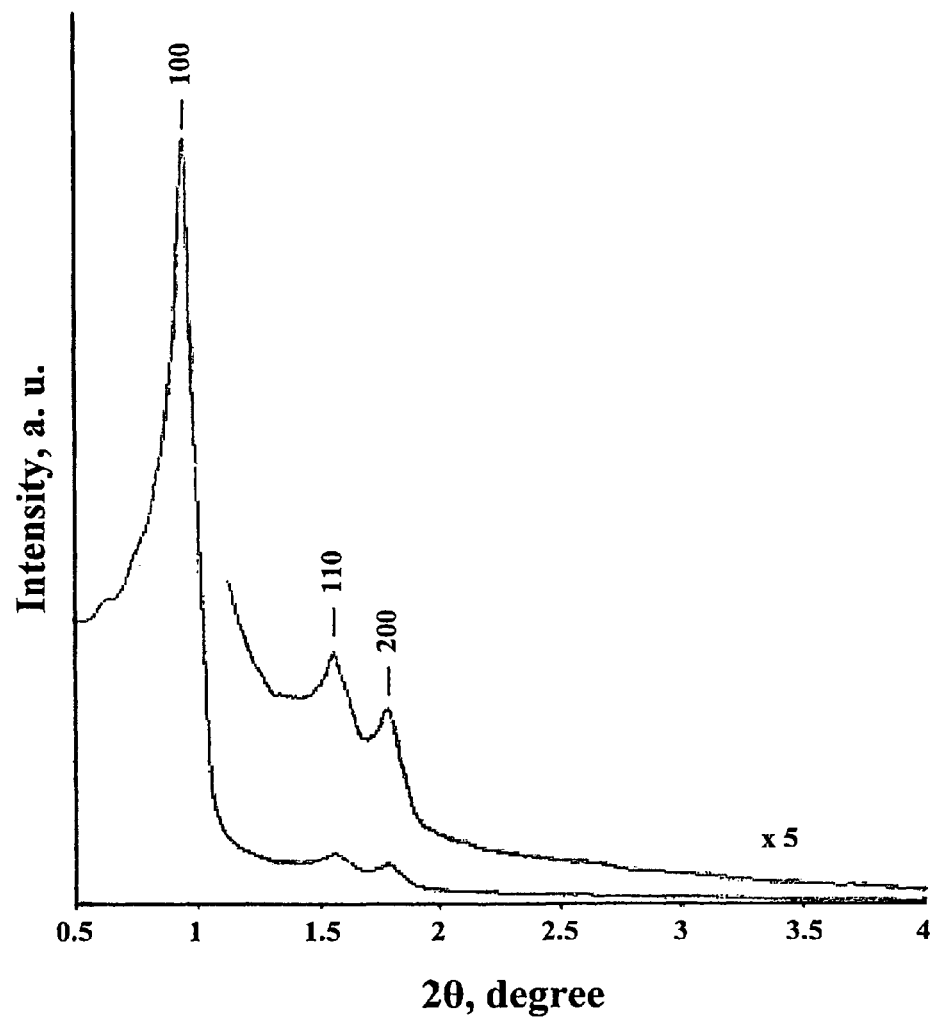
FIG. 2: The Small Angle X-Ray Scattering (SAXS) pattern of the SBA-15 porous matrix.

FIG. 2 presents SAXS patterns of the SBA-15 material obtained. The high-intensity first peak (100) has a d-spacing of 10.3 nm and the following peaks have d-values consistent with a hexagonal arrangement of the pores with the distance of 11.9 nm. These findings confirm that the SBA-15 has a well-defined hexagonal pore structure. The uniform mesopore diameter of the SBA-15 material was found to about 6.5 nm (BJH method). The pore wall thickness of the SBA-15 was calculated to be 5.4 nm. The BET surface area for the SBA-15 is 800 $m^2/g$ and the pore volume is 1.0 $cm^3/g$. Powder X-ray diffraction pattern of the SBA-15 exhibits a broad peak at about $2\Theta=24°$, corresponding to amorphous silica.

Example 1

Manganese Oxide-Cerium Oxide Composite 13.3 mL of a methanol solution containing manganese chloride ($MnCl_2.4H_2O$, Sigma) and cerium chloride ($CeCl_3.7H_2O$, Sigma) in concentrations of 1.675M and 0.195M, respectively, was prepared.

0.66 g of acetic acid ($CH_3COOH$, 99.7%, Frutarom) was added to the solution. The solution was then mixed with 1 g of the SBA-15 porous matrix (obtained in accordance with Preparation 1) for one minute, to form a suspension. Propylene oxide ($C_3H_6O$, Fluka) was introduced into the suspension (the molar ratio between the propylene oxide and the total quantity of the $MnCl_2*4H_2O$ and $CeCl_3.7H_2O$ salts was 6:1), following which the suspension was stirred for 15 min. The suspension was then filtered and the solid was left for 16 h under saturated pressure of methanol at 25° C. (by putting the solid in a small vessel placed within a larger vessel that was partially filled with methanol). The solid was then washed with methanol, and filtrated again three times. The solid was vacuum dried at 50° C. for 2 h, followed by calcination in air at 350° C. for 3 h, and for 2 h at 700° C., to give the SBA-15 matrix having the manganese oxide-cerium oxide composite therein.

The solid matrix having the composite therein was stirred at 50° C. for 1 h in 1.3 L of an aqueous ethanol solution containing NaOH in concentration of 1M (volume ratio of ethanol/water 1:1), in order to dissolve the silica. The resulting suspension was filtered and washed for several times with water, while keeping the layer formed on the filtration paper constantly wet. The wet material was again exposed to 1M NaOH solution for 1 h, followed by filtration and washing, first with water and later with acetone. The composite was finally dried at room temperature for 16 h.

Table 1 summarizes the characteristics of two intermediates (the SBA-15 matrix having the manganese oxide-cerium oxide composite therein, following calcination at 350° C. and 700° C., which intermediates are designated in the table below as Mn—Ce-SBA-350° C. and Mn—Ce-SBA-700° C., respectively) and the final, isolated manganese oxide-cerium oxide composite.

Example 2

Comparative

The comparative catalyst (atomic ratio Mn:Ce=1.45) was prepared by co-precipitation from mixed aqueous solutions of manganese chloride and cerium chloride as described by Imamura et. al (supra). 100 mL of this solution was poured at room temperature into 200 mL of 3 M aqueous sodium hydroxide (NaOH, 97%, Aldrich), and the resulting dense brown gel (after 30 minutes of aging) was separated by filtration, washed and dried in air at 100° C. for 16 hours followed by calcination at 350° C. for 3 h in air.

Table 2 summarizes the chemical and physical properties of the composite prepared in accordance with the Imamura reference (supra).

TABLE 1

| Material | Surface area ($m^2/g$) | Pore volume (mL/g) | Average pore diameter (nm) | Elemental Composition (Wt %) | | | Crystal phase | Mn oxide Ce oxide particle diameter (nm) | Bulk density (g/mL) |
|---|---|---|---|---|---|---|---|---|---|
| | | | | $Mn_2O_3$ | $CeO_2$ | $SiO_2$ | | | |
| Mn—Ce-SBA-350° C. | 497 | 0.75 | 6.0 | 16.2 | 20.4 | 63.4 | amorphous | — | 0.35 |
| Mn—Ce-SBA-700° C. | 319 | 0.48 | 6.1 | 16.6 | 19.2 | 64.2 | crystalline $Mn_2O_3$, $CeO_2$ | ~2-3 * | 0.35 |
| Final composite | 320 | 0.38 | 4.8 | 41.1 | 51.3 | 7.6 | crystalline $Mn_2O_3$, $CeO_2$ | ~2-3 * | 1.00 |

* For both $Mn_2O_3$ and $CeO_2$ phases

The average particle diameter of the $Mn_2O_3$ and $CeO_2$ crystalline phases were obtained from the XRD data. A comparison between FIGS. 1d and 1e shows that the removal of

TABLE 2

| Catalyst | Surface area ($m^2/g$) | Pore volume (mL/g) | Average pore diameter (nm) | Elemental Composition wt | | Crystal phase | Mn oxide Ce oxide particle diameter (nm) | Bulk density (g/mL) |
|---|---|---|---|---|---|---|---|---|
| | | | | Mn | Ce | | | |
| Reference catalyst | 110 | 0.30 | 12 | 24.38 | 49.72 | Crystalline $Mn_5O_8$, $CeO_2$ | 20**, 5*** | 0.82 |

**Manganese oxide crystals
***cerium oxide crystals the SBA-15 by the treatment with NaOH solution did not change the crystals diameter and phases structure. The isolated manganese oxide-cerium oxide composite shows an increase in x-ray signal intensity relative to the composite placed within the matrix, with no change in the crystalline characteristics. The x-ray scattering of the isolated composite remains broad, as in the porous matrix, in agreement with its nano-size. Essentially the broad line peaks coincide with the manganese oxide and cerium oxide peaks ($Mn_2O_3$ $2\theta$=23, 33, 55, and 64° and $CeO_2$ $2\theta$=28.5, 47.5 and 56.5°).

Example 3

Testing the Activity and Stability of the Catalyst in the Wet Oxidation of Organic Substances Performed in a Trickle Bed Reactor The catalytic activity of the composite of the present invention, obtained according to Example 1 above, was tested in a trickle bed reactor and compared with the prior art composite of Example 2 with respect to the catalytic wet oxidation of 2,4,6-trichlorophenol.

The catalyst was prepared as follows. The powdered composite obtained according to Example 1 was formed into pellets using a hydraulic press under a pressure of 5 ton. The pellets were then crushed and sieved to recover the fraction of 14 to 25 mesh. 1 g of the recovered material was loaded in the reactor (internal diameter of 20 mm). The manganese oxide-cerium oxide catalyst was supported between two layers of pure silica pellets of 1.5 mm. The prior art catalyst according to comparative Example 2 was formed into granules similarly.

The reactor was operated as follows: water containing 100 mg/liter 2,4,6-trichlorophenol was fed into the trickle bed reactor at a liquid hourly space velocity (LHSV) of 20 h$^{-1}$ or 6 h$^{-1}$ at various temperatures in the range between 80 to 140° C. Air was used as the oxidant, at partial oxygen pressure of 10 bar.

Figure 3:
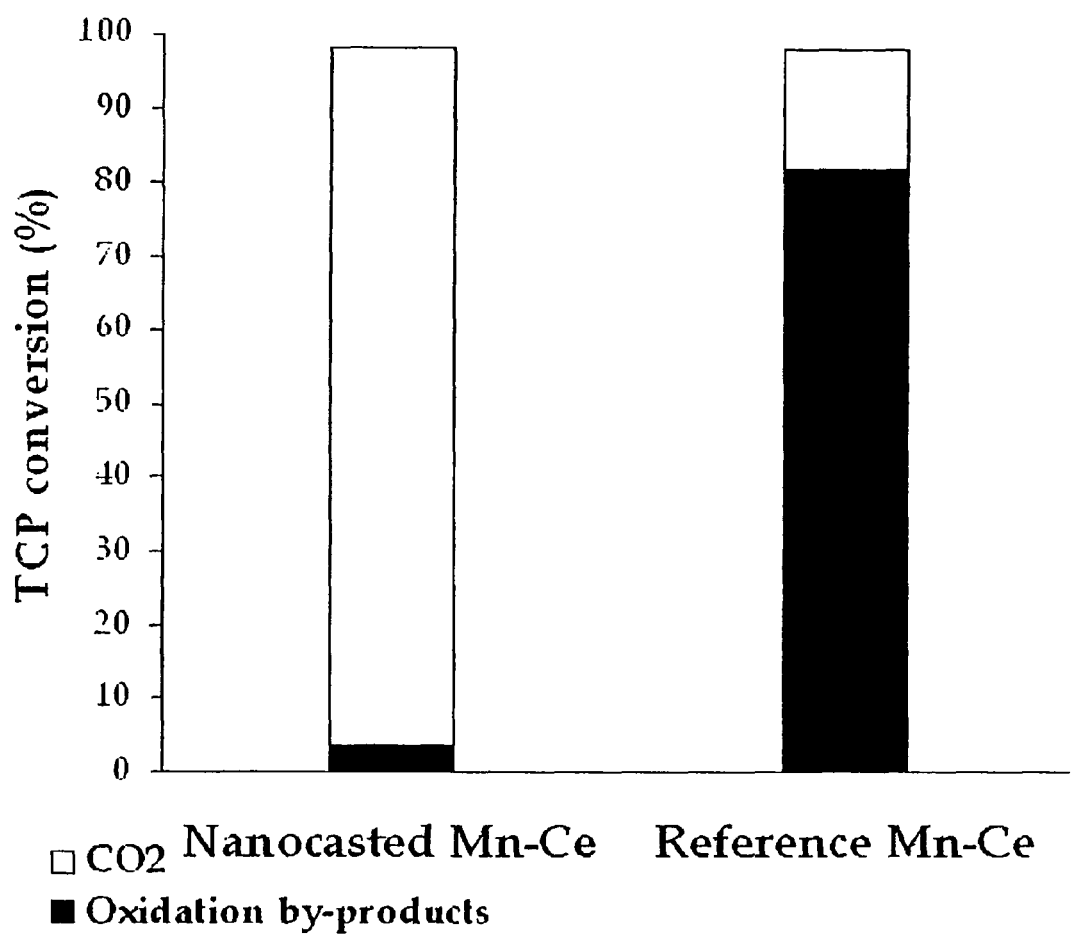
FIG. 3 is a bar diagram comparing the catalytic activity of the composite of the present invention with that of a prior art catalyst.

FIG. 3 is a bar diagram illustrating the degree of the conversion of the 2,4,6-trichlorophenol contaminant, and the distribution of its oxidation products using either the composite of the present invention (left bar) or the prior art composite (right bar) as the catalyst in the trickle bed reactor (operating at 120° C. and LHSV=20 h$^{-1}$). It is noted that for both catalysts the conversion of the contaminant is almost complete, though the composition of the products of the oxidation reaction are different: the catalyst according to the present invention converts over 95% of the organic contaminant into carbon dioxide while the prior art catalyst managed to convert less than 20% of the organic contaminant into carbon dioxide.

In order to evaluate the stability of the catalyst provided by the present invention, several samples of the outlet stream were analyzed for the presence of metal ions, and the extent of leaching was found to be insignificant (<1 mg/L total metal), which is less than 0.5% of the catalyst amount. Furthermore, after use over a period of 200 hours no change was observed in the rate of oxidation.

The composite of the present invention was also tested in the catalytic wet oxidation of methyl-tert-butyl ether (MTBE)—a contaminant which is a component of gasoline fuel, and hence present in the ground water. The conditions of the tests performed and the results obtained are shown in Table 3. It may be seen that at temperature in the range of 100-120° C. and LHSV of 5-10 h$^{-1}$, the composite according to the present invention is capable of removing 68-88% of MTBE from water. The close values of the conversion of MTBE and of the chemical oxygen demand (COD) indicate that in the catalytic wet oxidation process according to the present invention, MTBE is transformed essentially completely to $CO_2/H_2O$.

TABLE 3

Catalytic Wet Oxidation of MTBE with the Mn—Ce— oxide catalyst

| Run No. | T, ° C. | LHSV, hr$^{-1}$ | $P_{O2}$, bar | MTBE conversion, % | COD conversion, % |
|---|---|---|---|---|---|
| 1 | 120 | 5 | 10 | 88 | — |
| 2 | 100 | 10 | 10 | 66 | — |
| 3 | 120 | 10 | 10 | 68 | 67 |
| 4 | 120 | 10 | 20 | 75 | 72 |

[MTBE]$_{inlet}$ - 1000 mg/L, pH$_{inlet}$ = 6.6

Figure 4:
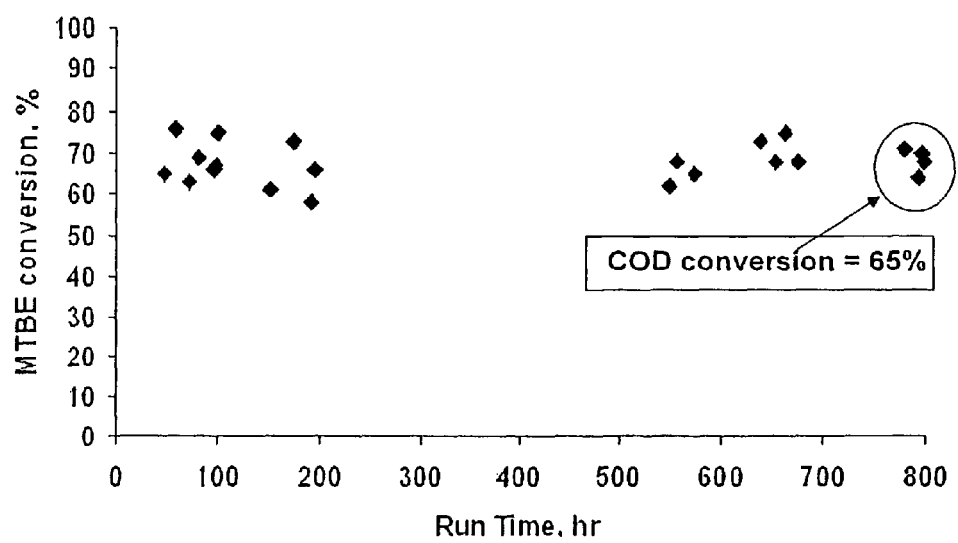
FIG. 4 is a graph illustrating the stability of the catalyst provided by the present invention during the wet oxidation of a certain organic compound.

In FIG. 4 the conversion of MTBE at standard conditions is plotted as a function of time. The results show that the catalyst is capable of maintaining its stability and efficacy over a long period of time (about 800 h).

The composite of the present invention was also tested in the catalytic wet oxidation of aniline (which is known to exist in industrial waste water). The conditions of the tests performed and the results obtained are shown in Table 4. It has been found that by operating at temperature in the range of 100-140° C. and LHSV of 5 h$^{-1}$ (with initial pH value of the treated water being 2.5, said pH level being adjusted by adding 2000 ppm of HCl, in order to maintain the stability of the catalyst), it is possible to remove 90-100% of the aniline contaminant from water. The TOC conversion reaches more than 90% at T=140° C. and the mineralization extent of organic nitrogen is 74%. It has been observed that the main direction of nitrogen conversion at 140° C. is to $NH_4^+$ ions, which neutralize the added acid, such that the pH of the purified water at the reactor outlet is essentially neutral (Table 4).

TABLE 4

Catalytic Wet Oxidation of Aniline with the Mn—Ce— oxide catalyst

| Run No. | T, ° C. | LHSV hr$^{-1}$ | $P_{O2}$, bar | Aniline % | TOC % | N-org % | N-org conversion selectivity to: | | | pH at the reactor outlet |
|---|---|---|---|---|---|---|---|---|---|---|
| | | | | | | | $N_2$ [%] | $NO_3^-, NO_2^-$ [%] | $NH_4^+$ [%] | |
| 1 | 100 | 5 | 10 | 90 | 70 | 63 | 67 | <1 | 32 | 6.4 |
| 2 | 120 | 5 | 10 | 100 | 87 | — | — | — | — | 6.4 |
| 3 | 140 | 5 | 10 | 100 | 91 | 74 | 8 | <1 | 91 | 6.1 |

[Aniline]$_{inlet}$ - 800 mg/L, pH$_{inlet}$ = 2.5

The invention claimed is:

1. A process for the preparation of a manganese oxide-cerium oxide composite, the process comprising the steps of:
   providing a porous matrix,
   mixing said porous matrix with a precursor solution containing manganese and cerium ions dissolved therein to form a suspension,
   triggering the formation of a non-fluid phase which contains manganese and cerium in the interior of said porous matrix, said non-fluid phase being in the form of a gel,
   wherein said triggering comprises introducing a pH modifying agent into the suspension, wherein said pH modifying agent raises the pH of said suspension gradually, such that the formation of said gel is accomplished following a prolonged period of time, and wherein the suspension further comprises a gelation inhibiting agent, thereby causing a further delay in the formation of the gel, separating said porous matrix from a liquid phase containing soluble metals, completing the formation of said gel which contains manganese and cerium in the interior of said porous matrix, heat treating said porous matrix to convert said gel containing manganese and cerium placed therein into a manganese oxide-cerium oxide composite, and isolating said composite from said porous matrix, said manganese oxide-cerium oxide composite having a surface area of not less than 300 $m^2/g$.

2. A process according to claim 1, wherein the porous matrix is a mesoporous silica.

3. A process according to claim 1, wherein the precursor solution comprises at least one hydrated manganese salt and at least one hydrated cerium salt dissolved in one or more water miscible organic solvents.

4. A process according to claim 3, wherein the water miscible organic solvent comprises a lower ($C_1$-$C_3$) alcohol.

5. A process according to claim 1, wherein the pH modifying agent is a proton scavenger capable of acting as a gel forming agent, such that the non-fluid phase containing manganese and cerium is obtained in the form of a gel.

6. A process according to claim 1, wherein the gelation inhibiting agent is an organic acid.

7. A process according to claim 1, wherein heat treating the porous matrix to convert the gel containing manganese and cerium placed therein into a manganese oxide-cerium oxide composite comprises calcination at a first temperature and a subsequent calcination at a second temperature, wherein said second temperature is sufficiently high to form an essentially crystalline composite within the porous matrix.

8. A process according to claim 1, wherein the manganese oxide-cerium oxide composite is isolated from the porous matrix by treating the composite-containing porous matrix in a solvent capable of dissolving said porous matrix, wherein said composite is insoluble in said solvent, following which said solid composite is recovered from the resulting suspension.

9. A process according to claim 1, which further comprises forming the isolated manganese oxide-cerium oxide composite into pellets or granules adapted for use as a catalyst.

* * * * *